April 1, 1941.  T. C. BROOKHART ET AL  2,237,047
FOOD HANDLING APPARATUS
Filed Aug. 8, 1938   4 Sheets-Sheet 3
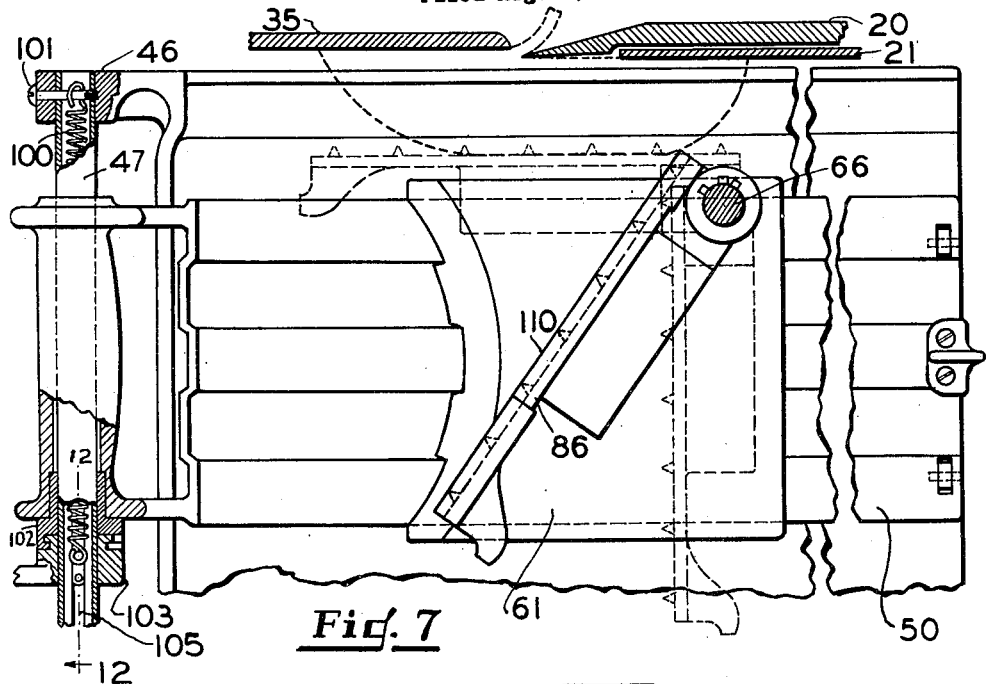
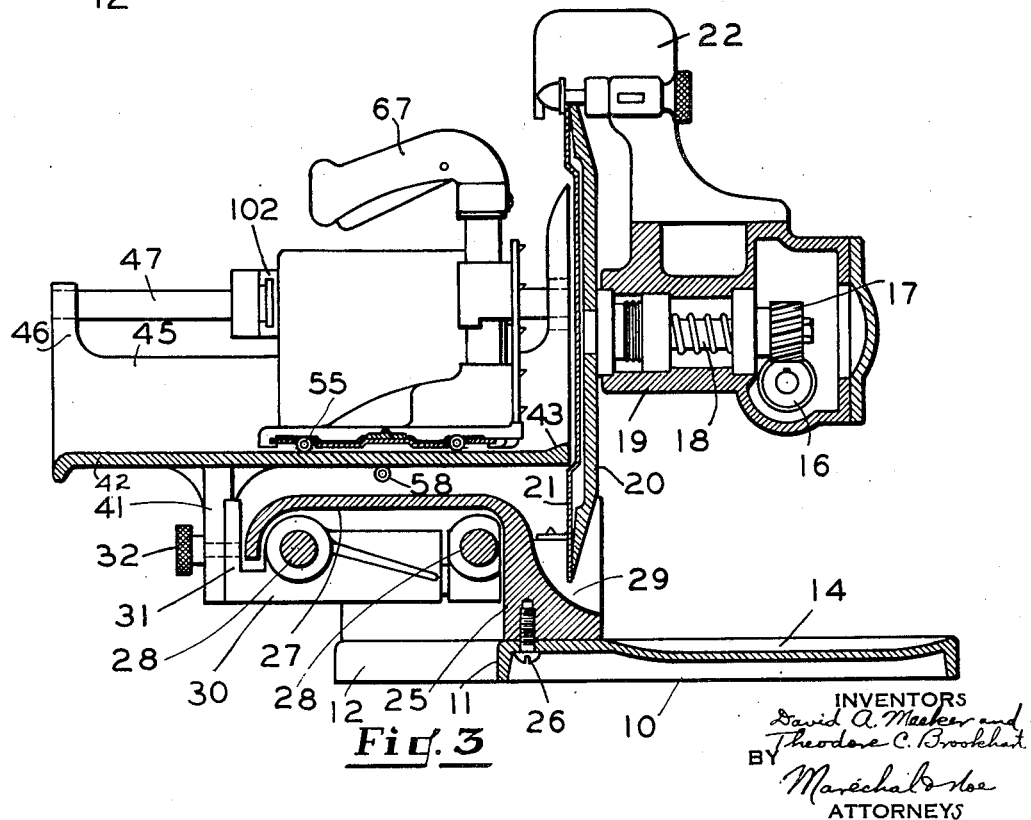
INVENTORS
David A. Meeker and
Theodore C. Brookhart
BY Marechal & Noe
ATTORNEYS April 1, 1941. T. C. BROOKHART ET AL 2,237,047
FOOD HANDLING APPARATUS
Filed Aug. 8, 1938  4 Sheets—Sheet 4
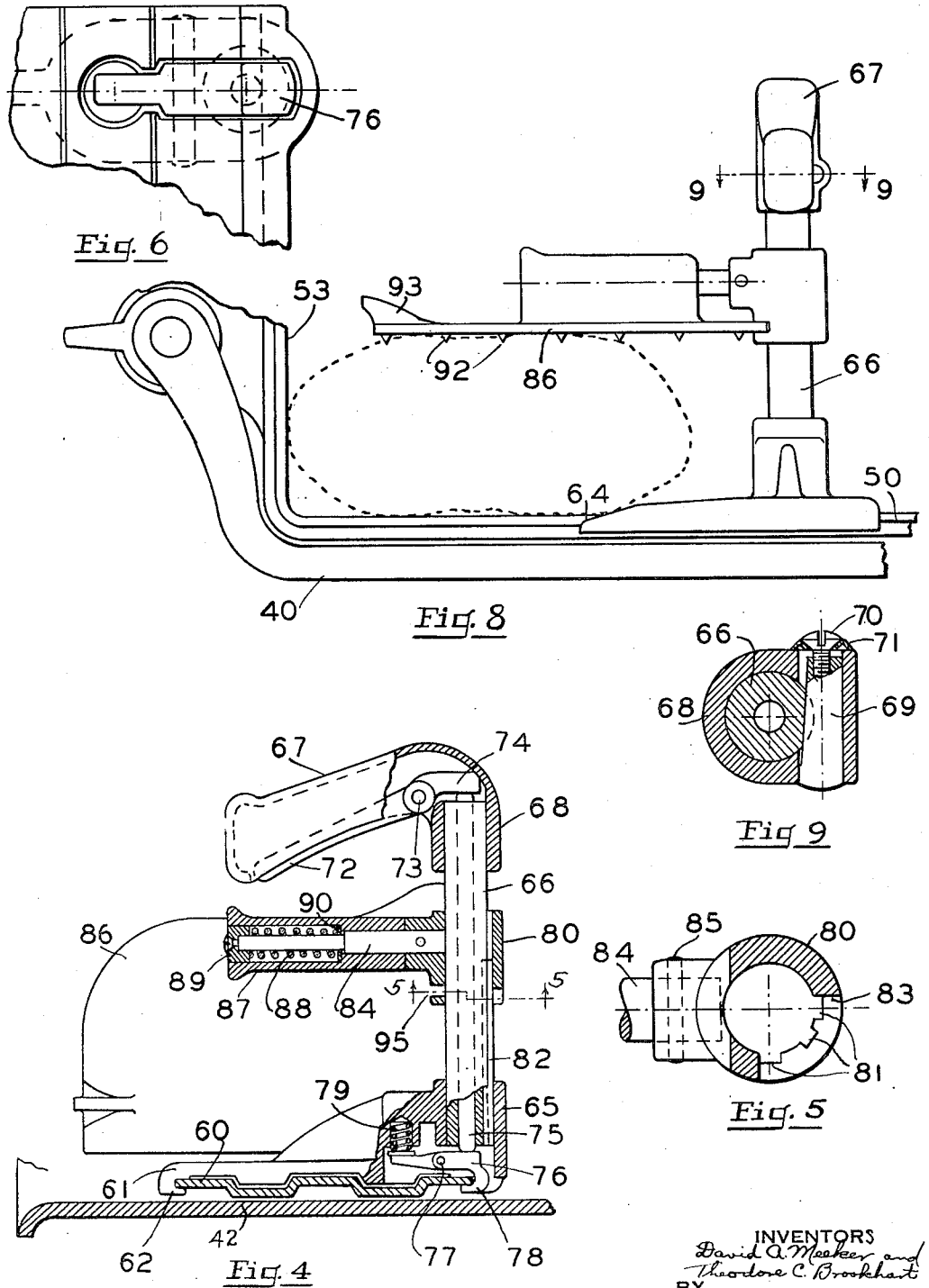
INVENTORS
David A. Meeker and
Theodore C. Brookhart
BY Maréchal & Noe
ATTORNEYS Patented Apr. 1, 1941

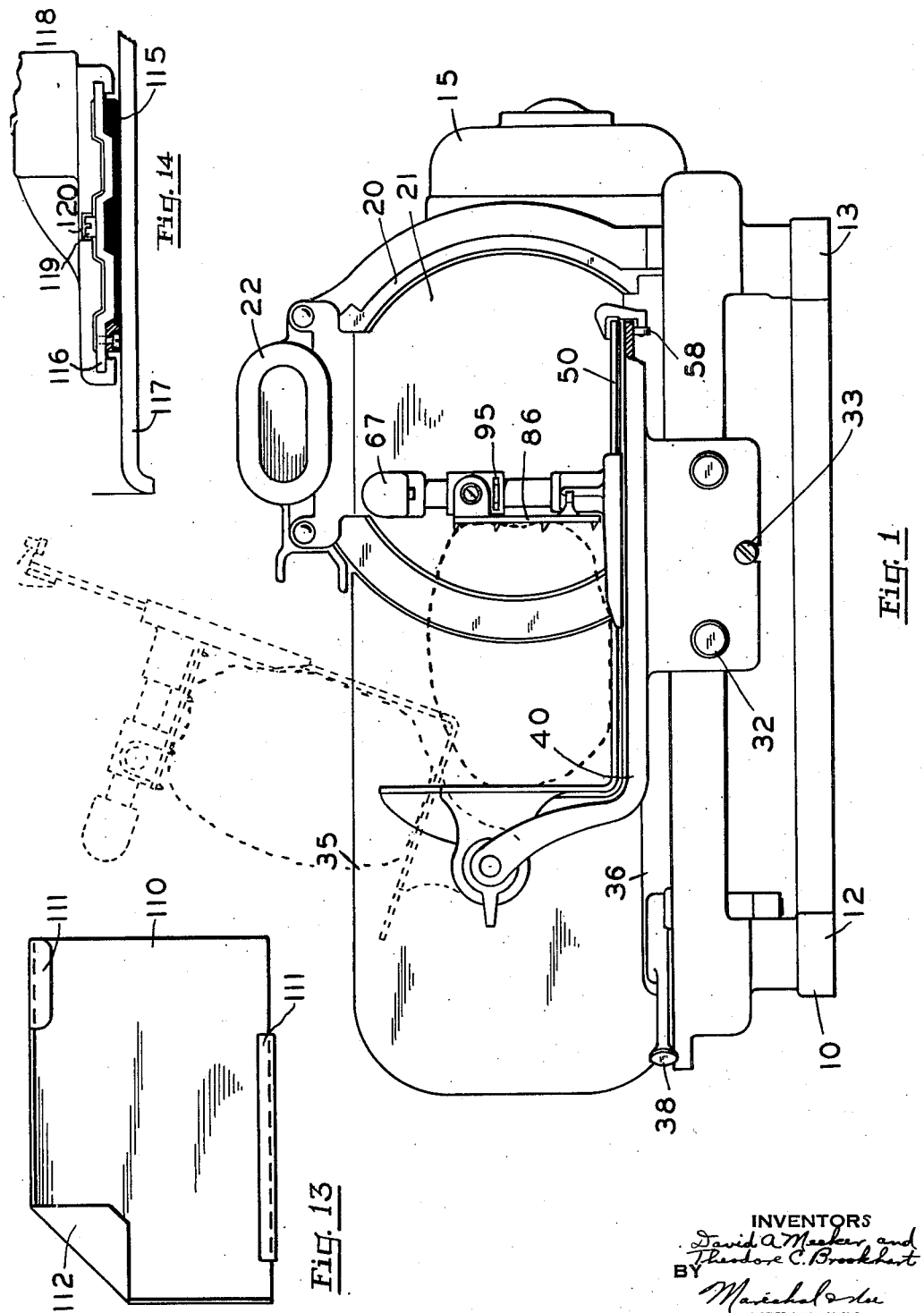

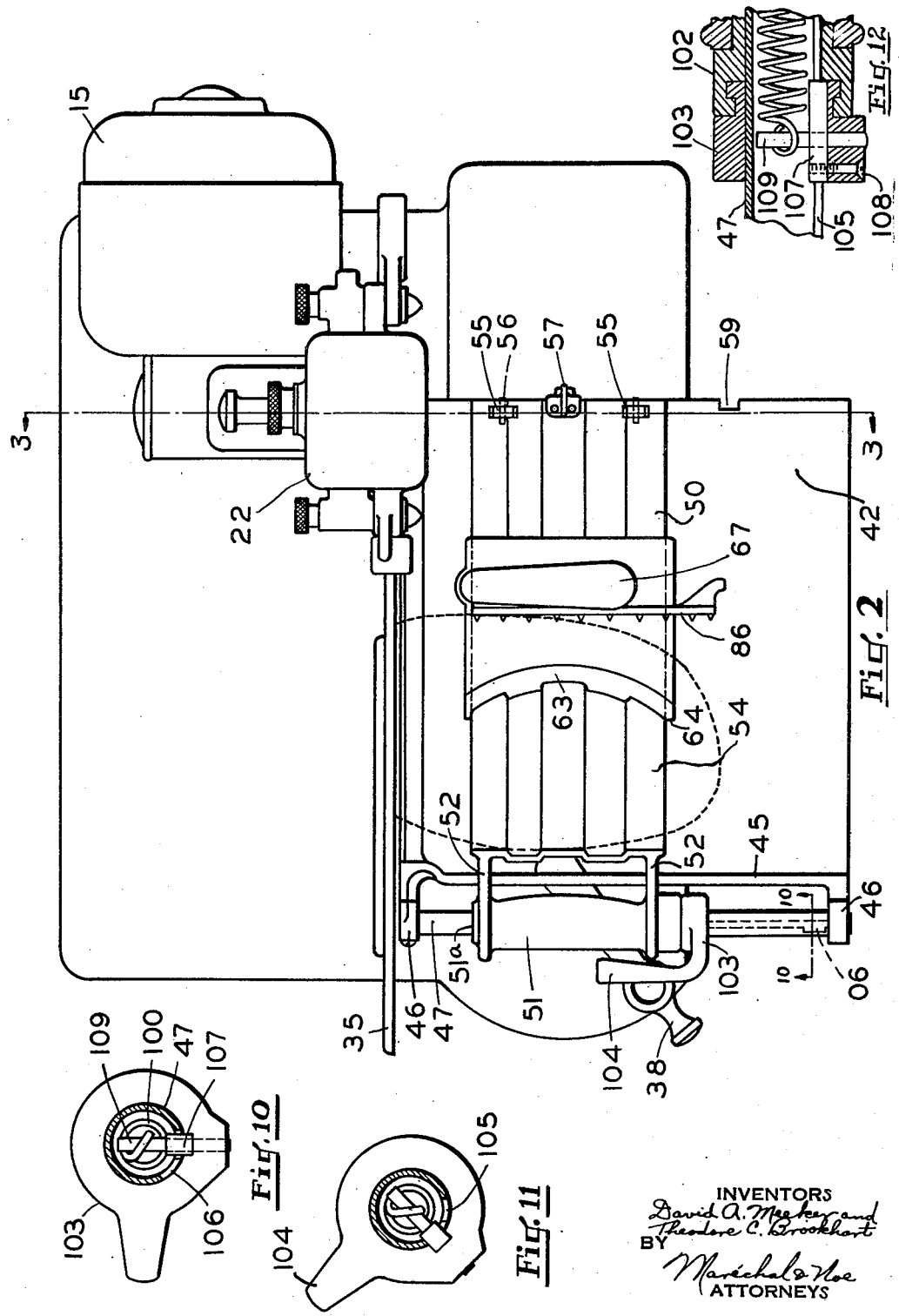

2,237,047

UNITED STATES PATENT OFFICE 2,237,047

FOOD HANDLING APPARATUS

Theodore C. Brookhart and David A. Meeker, Troy, Ohio, assignors to The Hobart Manufacturing Company, Troy, Ohio, a corporation of Ohio Application August 8, 1938, Serial No. 223,610

18 Claims. (Cl. 146—102)

This invention relates to food handling apparatus and more particularly to slicing machines.

It is the principal object of the invention to provide a highly effective and simple device for use with a slicing machine for holding and feeding the work material in a firm and proper manner into slicing relation with the knife.

It is a further object to provide a device of this character for use in the slicing of unusually large cuts of meat or the like, providing for proper holding and feeding of both small and large cuts, to secure the cutting of uniform slices of a desired thickness.

It is a further object to provide such a device for use with a gage plate and a manually reciprocable carriage in which work material of varying size is securely held while being reciprocated in strokes only as long as required for the length of the cut, to secure rapid and efficient action.

It is also an object to provide a slicing machine in which the face of the work material from which the slice is to be cut may be readily exhibited for inspection by the customer while the material is held firmly upon the machine and without disturbing its cutting relation to the knife.

Other objects and advantages will be apparent from the following description, the accompanying drawings, and the appended claims.

In the drawings,

Fig. 1 is a view in elevation with certain parts broken away, showing a slicing machine constructed in accordance with the present invention;

Fig. 2 is a plan view of such slicing machine;

Fig. 3 is a vertical sectional view on the line 3—3 of Fig. 2;

Fig. 4 is a view partially in section and partially in elevation showing the pusher plate from the rear thereof and its mounting and adjusting assembly;

Fig. 5 is a detail horizontal sectional view on the line 5—5 of Fig. 4;

Fig. 6 is a partial view in plan looking toward the bottom of the pusher plate assembly showing the friction locking means thereof;

Fig. 7 is a view partially in section and partially in plan showing positions in which the pusher plate may be placed for operation;

Fig. 8 is a partial view in elevation showing another operative position which the pusher plate may occupy;

Fig. 9 is a detail sectional view on the line 9—9 of Fig. 8;

Fig. 10 is a sectional view on the line 10—10 of Fig. 2 showing a detail of the feeding and locking means;

Fig. 11 is a view similar to Fig. 10 with the parts in the locked position;

Fig. 12 is a partial sectional view on the line 12—12 of Fig. 7;

Fig. 13 is an adapter for use in slicing bread and the like at an angle; and

Fig. 14 is a partial end elevational view of modified form of supporting means for the tray.

Referring to the drawings, which discloses a preferred embodiment of the invention, there is shown a main base member 10 which is provided with a downwardly turned integral peripheral flange 11 extending entirely around the same, the flange serving to support the machine and to provide an effective seal and to prevent access of material underneath the base. The base is provided with forwardly extending portions 12 and 13, integrally formed therewith. The top surface of the base at the rear side thereof is slightly dished as shown at 14 for the purpose of serving as a slice tray at the rear of the knife. The base member also provides a support for the motor 15 which drives a worm 16 engaging a worm gear 17 carried by the knife shaft 18. The knife shaft is suitably journaled in a housing portion 19, providing for rotatably supporting the circular cutting knife 20 in proper operative position. The knife may have a central dished construction as shown, in which case there is provided the knife guard plate 21 seating within the recessed portion of the knife, and providing for the support of the work material as it moves across the face of the knife. Alternatively, the knife arrangement disclosed in Patent No. 2,199,267 dated April 30, 1940, may be utilized, this construction providing for eliminating the guard plate, and for securing proper support of the work material as it moves across the knife while avoiding frictional and rubbing contact therewith. Suitable knife sharpening means 22 is preferably likewise associated with the rotary knife.

The base carries a main frame member 25 which is suitably fastened thereto by means of bolts 26 or the like, such main frame member extending above the projecting portions 12 and 13 and across the entire face of the slicing machine. It is relatively plain on its upper surface as indicated at 27, which portion overlies the slide rods 28, carried by the main frame member 25. The frame thus forms an impervious protecting covering overlying the slide rods, and adapted to prevent access of scraps of material down onto the rods. At the portion directly in front of and beneath the knife, the frame is formed as shown at 29, with a sloping curved construction such as to provide for the discharge of scraps from the forward side of the knife to the rear thereof, the passage being adapted to be readily cleaned out by passing a cleaning cloth therethrough.

The slide rods carry a supporting member 30 which is suitably journaled thereon, the member 30 being adapted to receive the carriage. The construction preferably comprises an upwardly extending flanged part 31, and fastening bolts 32 with temporary retaining stud 33, for receiving and firmly retaining the carriage in operative position while providing for removal thereof as desired.

Adjacent the operator's end of the machine, and generally in line with the knife, there is provided gage plate 35 suitably supported by a bracket member 36 mounted upon the portion 27 of the main frame member. Provision is made for adjusting the position of the gage plate with respect to the plane of the knife, suitable handle 38 being readily accessible from the operator's position for this purpose. The construction of slicing machine thus far illustrated corresponds generally with that disclosed in the patent of David A. Meeker and John C. Slager No. 2,151,862 dated Mar. 28, 1939. While such slicing machine structure forms a suitable machine for use in conjunction with the present invention, other constructions of slicing machine may similarly be used with satisfactory results.

The carriage indicated generally by reference numeral 40, constructed in accordance with the present invention, embodies the supporting flange 41 having a lower notched part for receiving stud 33 and with suitable provision for the reception of attaching bolts 32. Formed integrally with flange 41 is the carriage proper, the upper surface 42 of which is generally flat and extends in a generally horizontal plane. Adjacent the knife, the carriage is formed with an upwardly sloping edge portion 43 adapted to provide additional support for the work material during the course of the slicing operation. As will be apparent from the drawings, the upper surface 42 of the carriage is positioned substantially below the center line of the rotary knife, so as to provide for the cutting by the knife of work material having a greater dimension. Preferably a knife of relatively large diameter is utilized in the construction of the slicing machine of this invention, a knife diameter of 12½ inches, for example, having been found to give very satisfactory results in accordance with this invention. The surface 42 is also of substantial lateral extent both in the direction parallel to the plane of the knife, and in a direction normal thereto, to provide for receiving cuts of meat or the like of substantial size where desired.

At the end of the carriage adjacent the operator's position, the carriage is formed with an upwardly extending face 45, preferably integral with the main body of the carriage, and formed as a single casting. Lugs 46 extend upwardly from adjacent each end of the face 45 and provide a support for a tubular cross shaft 47. Shaft 47 forms a slidable support for receiving the tray member 50. Tray 50 is formed integrally with a tubular handle portion 51 adapted to be slidably mounted upon cross shaft 47. Arms 52 extend from opposite ends of the handle over the upper edge of the face 45 of the carriage, and are joined integrally with a vertical pusher face 53. The face 53 extends downwardly to a point closely adjacent the upper surface 42 of the carriage, and then at right angles along the upper surface of the carriage in the form of a tray member 54. Portion 53 is of a width sufficient to provide an adequate support for the work material, the width being substantially less than that of the carriage 40. In length it is substantially the same as carriage 40 so that it terminates adjacent the forward edge thereof. At its forward edge, the tray is provided with a pair of rollers 55 suitably pinned by means of pins 56 to the tray in apertures formed therein, and of such diameter that they extend through the tray and engage the upper surface of the carriage 40 to provide support for the forward edge of the tray during movement of the tray toward and away from the face of the knife. To avoid undesired lifting of the tray away from the surface of the carriage, a clamp member 57 is fastened to the edge of the tray, extending around the edge of the carriage, and provided with a roller 58 adapted to ride upon the lower surface of the carriage to maintain the tray in its desired operative position. A notch 59 is formed in the edge of the carriage 40, in a predetermined position, such that when the tray is moved away from the knife plane to about its position of maximum withdrawal therefrom, roller 58 is in alignment with notch 59 and may be drawn upwardly therethrough to effect the lifting of the tray upwardly away from the carriage.

Both the horizontal part 54 of the tray and the vertical face 53 thereof are formed with a plurality of raised ribs 60 alternating with depressions to provide additional strength and rigidity in the tray structure and to provide for gripping the work material more firmly, the depressions serving to hold the work securely in clamped position on the tray, assuring proper feeding and preventing displacement from position under the cutting action. The raised portions lie at each longitudinal edge of the tray and thus extend above the level of the surface 42 to provide for slidably receiving a base plate 61 thereon. Plate 61 is formed with downwardly and inwardly turned flanges 62 which are adapted to be slidably engaged on the edges of ribs 60, to guide the movement of the base plate 61 along the surface of tray 54, and in a direction generally parallel with the knife plane. The base plate is of less extent longitudinally than the tray, and is made of sufficient length to provide only for proper guiding and supporting action thereon. The base plate 61 is formed with an upper surface, the edge 63 of which extending in the direction of vertical face 53 of the tray is arcuate in shape and is formed with a sloping surface projecting at its sides 64, and over the depressions in the bottom of the tray, to a lower level than the top of ribs 60. This provides for readily lifting a piece of even relatively soft work material upon the surface of the base plate as the plate is moved underneath the same, without damaging or cutting into it.

Adjacent its forward end, the base plate 61 is provided with an integral enlarged portion 65, within which portion there is fixed the vertically extending shaft 66. A manual operating handle 67 is fastened to the upper end of shaft 66 by means of a collar 68, formed integrally with handle part 67, and a pin 69 is received within collar 68, the pin and the collar having cooperating flat faces. A bolt 70 holds pin 69 in place and washer 71 prevents access of foreign matter thereto. Upon the tightening of bolt 70, the tapered side of the pin is drawn firmly against the flat portion of the shaft, and the handle is thus securely attached to the upper end of the shaft.

Latching finger 72 is pivotally mounted at 73 within the handle 67. The latching finger is formed with an operating extension 74 adapted to overlie the end of shaft 66, and to engage a central operating pin 75, extending therethrough. The pin 75 projects beyond the lower end of shaft 66, and there engages lever 76 which is pivotally carried at 77 in the enlarged portion of base plate 61. A hook shaped part 78 is formed at one end of the lever adapted to engage the raised edge of the tray and resilient means 79 acting on the other end tends to urge the hook member into frictional engaging contact with the edge of tray 50. When the latching finger is released, resilient means 79 causes member 78 to frictionally engage the surface of the tray to resist movement of the base plate with respect to the tray and to hold the parts in predetermined relative adjustment; upon the grasping of finger 72 and actuation thereof by the hand of the operator, the hook member is withdrawn from engaging contact, and the base plate is free for adjusting movement longitudinally with respect to the tray 50.

A collar 80 is slidably mounted upon shaft 66 and is provided with a series of keyways 81, located in predetermined angular positions with respect to each other, for selective engagement with a vertically extending key 82 in shaft 66 to retain the collar in a predetermined desired angular relation with respect to the shaft while providing for vertical adjustment thereof. The portion of the collar between the keyways 81 is cut away as shown at 83, to facilitate the adjustment of the collar to receive the key in one or the other of the keyways.

A pusher plate shaft 84 is fastened to collar 80 by means of pin 85, and extends therefrom at substantially right angles. Shaft 84 provides for receiving and supporting the pusher plate 86, which is formed upon its rear face with a sleeve 87 adapted to engage shaft 84 in adjustable supporting relation. The sleeve is also recessed to provide for receiving resilient means 88 therein which is fastened in place at one end by means of the fastening member 89 fixed with respect to shaft 84. At its opposite end spring 88 bears against a washer 90 which is engaged by the interior shouldered portion of the sleeve 87, so that the spring tends to normally maintain the pusher plate in the position shown in Fig. 4. However, the pusher plate may be moved to the left as shown in that view, against the compressing action of the spring, and in that position may be rotated axially with respect to shaft 84. The work engaging face of the pusher plate is formed with suitable projections 92 which are adapted to engage the work material for holding the same firmly in desired position. The rear face is formed with a lug 93 adapted to limit movement of the pusher plate assembly toward the vertical face 53 of the tray when in position to operate as a last slice device.

In order to facilitate the feeding of the work material toward the knife for slicing purposes, tubular shaft 47 is provided with an internally located resilient feeding means comprising a tension spring 100. One end of the spring is fastened over a cross bolt 101 fitting within the inner arm 46 of the carriage which is adjacent the gage plate. A sleeve 102 is fastened at its outer end to the handle 51 of the tray and has an annular grooved recess therein adapted to receive a locking collar 103. One side of the sleeve 102 is slotted out at the side as shown in Fig. 3 sufficiently to permit the collar to slide therethrough, the collar in the assembled position on shaft 47 being rotatable with respect to sleeve 102 and handle 51, but not movable axially with respect thereto. The collar is formed integrally with a handle part 104 which extends adjacent the handle 51 of the tray. A longitudinal slot 105 is formed in the lower wall of shaft 47 with a cut out notched part 106 formed therein at the outer end of the shaft.

A slidable key 107 is held in place in the collar by screw 108 and is adapted to slide freely in slot 105 with only sufficient clearance to provide limited rotation of the collar on the shaft 47. The key is provided with a part 109 extending into the hollow portion of the shaft to which is attached the end of spring 100, the spring providing a tension force tending to draw the collar and tray assembly toward the knife and gage plate. The spring is also given a preliminary twist so that it has a limited torsional force tending to rotate the key 107 and the collar in a clockwise direction as shown in Fig. 10 into notch 106, the torsional force however being relatively so slight that no material drag is produced between the key 107 and the longitudinal wall of slot 105 in the normal feeding operation and any resistance created thereby to the forward feeding of the work material under the tension force of the spring is negligible. Thus when the tray is moved on the carriage away from the knife to substantially its outermost position, key 107 which has been prevented from rotation by engagement with slot 105, comes in line with cut out or notched part 106 and under the torsional action of the spring is snapped into a locking or holding position. In such position the tray and pusher plate may be suitably adjusted and the work material positioned therein. Upon the operator grasping the handle 51 of the tray, and allowing the palm of his hand to bear down upon handle 104, the key 107 is moved angularly out of notch 106 and is then free to slide longitudinally in slot 105 under the pull of spring 100. Such motion is transmitted to the tray and the work material thereon is thus caused to feed automatically toward the gage plate and knife.

It is desirable to avoid excessive rubbing and frictional contact of the work material with the gage plate and the knife, particularly upon the return or non-cutting stroke of the carriage. This condition is secured herein by the construction and arrangement of the parts above described. Thus when the operator does not apply pressure to handle 104, the key slides freely in the slot; but when pressure is applied, the key frictionally engages the wall of the slot and acts as a brake to arrest the action of the feeding spring. When the carriage has been advanced as far as desired on the forward travel, the operator pulls backward on handle 51 to return the carriage, and it is easy and natural to simultaneously apply a pressure to handle 104 thereby holding the tray in fixed position upon the carriage. Thus the spring does not continue to urge the work material against the face of the knife and gage plate during the return stroke, and unnecessary frictional contact of the work material thereon is thus avoided. Upon the return of the carriage and the beginning of the forward stroke, the operator raises his hand above handle 104 and the spring action then causes the feeding of the work material into contact with the gage plate in preparation for a further slicing operation.

The pusher plate has a plurality of operative positions for holding and feeding the work material to be sliced by the knife. As shown in Fig. 7 in one dotted line position of the pusher plate, it is parallel with and faces the vertical surface 53 of tray 50, and in this position provides for receiving a piece of work material and clamping the same, upon movement of the pusher plate over the horizontal part 54 of the tray, between the plate and vertical face 53 of the tray, to be firmly held thereby during the reciprocation of the carriage. In operation, the work material is placed in position upon tray 50, with one side thereof adjacent the supporting face 53. The inner edge of the work material is positioned adjacent the gage plate 35, and the tray assembly moved along shaft 47 in a direction away from the gage plate a sufficient distance to provide for the cutting of a number of slices therefrom. During the positioning of the work material on the tray the tray may be drawn away from the knife to its outer position where handle 104 is automatically moved into its locking position, holding the tray in fixed position relative to the carriage. With the tray suitably positioned so that it supports the main mass of the work material, the pusher plate handle 67 is manually grasped by the operator, who simultaneously effects the lifting of latch finger 72, to release the friction holding device and thereby permit the movement of the base plate and pusher plate assembly into firm clamping relation with the forward surface of the work material, the leading edge of the base lifting the work material upon itself without injury to the work material. When thus engaged, the latch finger is released and the pusher plate thus remains in proper clamping relation during the slicing operation. In the course of the operation, the handle part 51 is manually grasped by the operator to produce reciprocating motion of the carriage in cutting strokes for severing the work material, and to control the feeding of the tray and the work material toward the plane of the knife, as successive slices are cut therefrom, the handle 104 being actuated as described to limit the forward feed produced by the spring and to avoid objectionable frictional contact. A limitation of the forward feeding action is provided by engagement of boss 51a of the tray handle with lug 46 such as to provide for advance of the tray toward the knife plane to a maximum safe position which will prevent contact of the metal parts with the knife or gage plate. When the position of maximum feed has been reached in the slicing operation, the tray is again withdrawn, the pusher plate disengaged from the work material to provide for repositioning thereof upon the tray with the part to be cut overhanging the tray and supported on the carriage, following which the same operation is repeated. Throughout the operation a firm hold upon the work material is maintained and the inner portion of the material directly adjacent the knife is properly supported throughout the reciprocating movement on edge 43 so that slices of any desired thickness may be cut quickly and uniformly.

When it is desired to feed a small piece, or an end, of the work material, the pusher plate assembly is lifted vertically with respect to shaft 66, and at its upper position is rotated to the other dotted line position shown in Fig. 7, in which the pusher plate stands vertically and generally parallel with the knife plane. The assembly is then moved downwardly on shaft 66 where it is held against rotation by engagement of the selected slot 81 with the key 82. In this position the carriage is again reciprocated manually by means of handle 51, the work material being fed progressively forward as the slices are cut therefrom until it is exhausted, the pusher plate in this position acting as a last slice holder. The same feed limiting means as above described provides for limiting the advance movement of the pusher plate to a safe position.

Fig. 7 shows also the pusher plate located in an intermediate position which provides for the slicing of the work material on an angle, such as is desired for example in the slicing of French bread. An intermediate slot 81 is provided and is engaged over key 82 by suitably lifting and turning the pusher plate about the axis of shaft 66. A removable adapter plate 110 shown in Fig. 13 having a substantially plane face is provided to slip over and cover the toothed face of the pusher plate, making it possible to feed the work material smoothly thereacross. The plate has turned over portions 111 which engage the upper and lower edges of the pusher plate, and is also formed with a turned over portion 112 at one end which limits the distance the adapter can move onto the pusher plate, holding the adapter plate in proper position thereon. With the adapter plate in operative position as shown, the work material is manually held against the adapter and may be moved thereacross and into cutting relation with the knife as the carriage is reciprocated, the tray being advanced in successive strokes toward the knife in the manner described.

The pusher plate has still a further operative position of adjustment. As shown in Fig. 8, it is sometimes desired to clamp work material against the lower surface of the tray, such being the case more particularly with flat pieces such as bacon for example. In such case, the pusher plate assembly is first placed in the position shown in Fig. 7 where it stands vertical and parallel with the knife. Thereafter the sleeve 87 is moved axially away from shaft 66 until the end of the pusher plate adjacent its support clears shaft 66 and the part 65 of the base. The pusher plate is then rotated through an arc of approximately 90° about the axis of shaft 84, to cause the work engaging surface thereof to face downwardly toward the surface 54 of the tray. A notch 95 is formed in the collar 80, and is adapted to receive the edge of the pusher plate to thereby hold the pusher plate in desired angular position during the operation of the machine. Inasmuch as the sleeve 87 is fastened to the pusher plate adjacent the edge thereof, it will be evident that when the pusher plate is placed in this position of adjustment, it will extend generally in overlying relation with respect to the base plate 61, and with respect to the surface 54 of the tray. In this position, the entire pusher plate assembly is lowered upon shaft 66 until the work engaging face thereof contacts the work material, to cause the clamping and holding of the same firmly upon the movable tray. When the pusher plate assembly is pressed firmly down upon the work material, the collar 80 of plate 86 having a tendency to bind upon shaft 66, to thereby provide a restraining action upon the pusher plate, tending to keep it in firm contact with the work material. In this position the slicing operation is substantially similar to that described above, the carriage being reciprocated by means of handle 51 and simultaneously fed toward the knife as the slices are cut therefrom. The upper surface of the tray 54, and the edge 43 of the carriage, being generally in the same plane, provide firm and proper support throughout all of the slicing operations for the work material so that even very large and bulky cuts of meat for example which cannot be successfully handled by the average slicing machine, may be securely held and properly cut by the machine of the present invention.

For some purposes it is desirable that the customer be able to inspect the work material from which slices are to be cut. Where, however, the work material is positioned within the machine, it is both inconvenient and undesirable to remove the work material therefrom, exhibit it to the customer, and then replace it in the machine where the probabilities are that it will not be put back in the same position from which it is removed, so that the first slice or two will be incomplete and partially wasted. In accordance with the present invention means are provided which makes it possible to exhibit the work material at any time during the course of the slicing operation to the customer, without disturbing its position within the machine and with respect to the gage plate and knife. For this purpose the entire tray and pusher plate assembly is first withdrawn from the knife to the position where roller 58 will clear through notch 59 in which position the tray is automatically held against forward feeding action of the spring by the means described above and the entire pusher plate tray and pusher plate assembly including the work material held therebetween may then be lifted by means of handle 67 to cause the pivoting of the entire assembly about the shaft 47 to the position shown in dotted lines in Fig. 1. By means of lifting the tray and work material in this manner, the operator provides for showing the face of the work material above the edge of the gage plate 35, so that it may be fully exposed to the view of the customer. Thereafter the assembly is lowered into its operative position, roller 58 passing downwardly through notch 59, and when handle 104 is actuated to cause release of the holding means the tray is moved toward the knife, into proper slicing position. In this normal operative position, roller 58 prevents any lifting of the work material away from the carriage by frictional contact with the upwardly moving surface of the knife where the knife guard plate is dispensed with. Thus this arrangement provides for properly retaining the work material in operative position at all times, and in a normal operative position substantially below the center of the knife to provide for cutting material of greater depth while avoiding any objectionable tendency of the knife to cause displacement of the work material by frictional contact therewith.

Fig. 14 shows a modified construction of tray making use of fixed supporting shoe 115 attached to the underside of the tray 116 adjacent the forward edge thereof, and in such position as to ride upon the forward edge of carriage 117. Shoe 115 may be made of moulded composition material and provides for guiding and supporting the tray as it moves across the top of the carriage with a minimum of friction. Such structure is easily cleaned and does not provide recesses in which the work material may collect. Preferably the forward edge of tray 116 overhangs carriage 117 a limited amount to provide a greater extent of adjustment of the pusher plate 118 thereon, and a limit stop in the form of a bolt 119 is positioned at the outer end of the tray adapted to enter a cut out portion 120 of the pusher plate base to prevent accidental removal of the pusher plate.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A slicing machine of the character described comprising a knife, a carriage reciprocable across the face of said knife, a tray having a lower surface closely overlying said carriage, means on said carriage for mounting said tray for movement across said carriage toward and away from said knife, a pusher plate base carried by said tray, means for mounting said base for longitudinal adjustment along said lower surface of said tray in the direction of the reciprocating movement of said carriage, means for retaining said base in adjusted positioning relative to said tray, an upright means carried by said base, a pusher plate, and means for adjustably mounting said pusher plate upon said upright means for adjustment about an axis generally normal to said tray and said carriage.

2. A slicing machine of the character described comprising a knife, a carriage reciprocable across the face of said knife, a tray having a lower surface closely overlying said carriage, means on said carriage for mounting said tray for movement across said carriage toward and away from said knife, a pusher plate base carried by said tray, means for mounting said base for longitudinal adjustment along said lower surface of said tray in the direction of the reciprocating movement of said carriage, means for retaining said base in adjusted positioning relative to said tray, an upright means carried by said pusher plate base, a pusher plate, and means for mounting said pusher plate on said upright means for adjustment between a position generally transverse of said tray and a position generally parallel therewith.

3. A slicing machine of the character described comprising a knife, a carriage reciprocable across the face of said knife, a tray having a lower surface closely overlying said carriage, means on said carriage for mounting said tray for movement across said carriage toward and away from said knife, a pusher plate base carried by said tray, means for mounting said base for adjustment along said lower surface of said tray in the direction of the reciprocating movement of said carriage, an upright means carried by said pusher plate base, a pusher plate, means for mounting said pusher plate for adjustment about said upright, and additional means for adjusting said pusher plate about an axis generally at right angles to said upright.

4. A slicing machine of the character described comprising a knife, a carriage reciprocable across the face of said knife, a tray having a lower surface closely overlying said carriage for the support of work material thereupon and with its forward edge supported on said carriage, said tray also having an upwardly extending surface adjacent the rearward end thereof, a cross shaft carried by said carriage adjacent said upwardly extending surface of the tray, means for mounting said tray upon said cross shaft for movement toward and away from said knife, and means for clamping work material upon said tray for movement therewith across said carriage including a pusher plate, and means carried by the forward part of said tray in spaced relation with respect to said upwardly extending surface of the tray for adjustably mounting said pusher plate on the lower surface of said tray with the pusher plate opposed to and generally facing the upwardly extending surface of said tray.

5. A slicing machine of the character described comprising a knife, a carriage reciprocable across the face of said knife, a tray having a lower surface closely overlying said carriage for the support of work material thereupon and with its forward edge supported on said carriage, said tray also having an upwardly extending surface adjacent the rearward end thereof, a cross shaft carried by said carriage adjacent said upwardly extending surface of the tray and above the work supporting surface of the tray, means for mounting said tray upon said cross shaft for movement toward and away from said knife, and means for clamping work material upon said tray for movement therewith across said carriage including a pusher plate, and means carried by the forward part of said tray in spaced relation with respect to said upwardly extending surface of the tray for adjustably mounting said pusher plate on the lower surface of said tray with the pusher plate opposed to and generally facing the upwardly extending surface of said tray, said tray with the work material clamped thereon being rotatable bodily about said cross shaft to lift the work material in clamped position to a position to expose the same to the view of the customer.

6. A slicing machine of the character described comprising a knife, a carriage reciprocable across the face of said knife, a tray having a lower surface closely overlying said carriage, a cross shaft on said carriage, means including a handle on said tray for mounting said tray on said cross shaft for movement with respect to said carriage toward and away from said knife, means for clamping work material upon said tray for movement therewith across said carriage, resilient means tending to cause the feeding of said tray and the work material thereon toward said knife, a collar mounted on said handle for rotary movement about the axis of said cross shaft, said cross shaft being provided with an elongated slot, and means carried by said collar and operable in said slot upon manual rotation of the collar for checking said feeding means to limit the feeding action.

7. A slicing machine of the character described comprising a knife, a carriage reciprocable across the face of said knife, a tray having a lower surface closely overlying said carriage, a cross shaft on said carriage positioned adjacent the rearward side of said tray, means for mounting said tray on said cross shaft for movement with respect to said carriage toward and away from said knife, means for clamping work material upon said tray for movement therewith across said carriage, resilient means tending to cause the feeding of said tray and the work material thereon toward said knife, a rotatable member carried by said tray coaxially with said cross shaft and in a position to be readily accessible to the hand of the operator during use, means for mounting said rotatable member for limited rotary movement about the axis of said shaft, and means operable in response to rotation of said rotatable member for resisting operation of said feeding means.

8. A slicing machine of the character described comprising a knife, a carriage reciprocable across the face of said knife, a tray having a lower surface closely overlying said carriage, a cross shaft on said carriage, means for mounting said tray on said cross shaft for movement thereof with respect to said tray toward and away from said knife, said tray having a handle portion providing for operation of said tray and said carriage by the hand of the operator, means for clamping work material in supporting relation upon said tray for movement therewith with respect to said carriage, resilient means tending to feed said tray with the work material thereon toward said knife, normally inactive friction means for resisting said feeding means, and a control member positioned adjacent said handle and extending in overlapping relation with respect to said handle in a position to be engaged by the palm of an operator's hand while on the handle for causing selective application of said friction brake means.

9. A slicing machine of the character described comprising a knife, a carriage reciprocable across the face of said knife, a tray having a lower surface closely overlying said carriage, a cross shaft on said carriage, means for mounting said tray on said cross shaft for movement with respect to said carriage toward and away from said knife, means for clamping work material upon said tray for movement therewith across said carriage, resilient means for feeding said tray and the work material thereon toward said knife, normally inactive friction means for resisting the action of said feeding means, a control member adapted to be manually operated to selectively control the application of said friction means, and means operable by said resilient means in the position of said tray remote from said knife for effecting the locking thereof in such position, said control member providing for unlocking thereof under the actuation of the operator.

10. A slicing machine of the character described which comprises a base, a gage plate, a knife, a carriage having an upper surface providing for supporting work material, means for mounting said carriage for manual reciprocation with respect to the knife, a tray having a lower portion closely overlying said upper surface of said carriage for receiving and supporting the work material, means for mounting said tray upon said carriage for movement normal to said knife and substantially immediately adjacent the plane thereof, a pusher plate carried by said tray upon the lower surface thereof and movable therewith to a position immediately adjacent the plane of said knife, and means for adjustably mounting said pusher plate upon said tray for movement along the surface of said tray in a direction generally parallel with the reciprocating motion of said carriage to clamp the work material on the tray with said work material supported throughout substantially its entire length and in all positions of the tray by said upper surface of the carriage and said lower portion of the tray.

11. A slicing machine of the character described which comprises a base, a gage plate, a knife, a carriage reciprocable with respect to the knife and having an upper surface providing for supporting work material, a tray having a lower surface closely overlying said upper surface of said carriage for supporting work material thereon, the upper surface of said carriage extending substantially into the plane of said lower surface of the tray for joint support of the work material thereon said tray also having an upwardly extending surface adjacent one end thereof, means adjacent said upwardly extending surface for mounting said tray upon said carriage for movement from a position spaced from said knife substantially into the plane thereof, means at the opposite end of said tray for supporting the same from said carriage, a pusher plate carried upon the lower surface of said tray and movable therewith into the knife plane, and means for mounting said pusher plate upon said tray for adjustable movement of said pusher plate along the lower surface of said tray in the direction of said reciprocating movement toward said upwardly extending surface to clamp the work material on the tray with said work material supported throughout substantially its entire length and in all positions of the tray by said upper surface of the carriage and said lower portion of the tray.

12. A carriage for a slicing machine of the character described having a rotary slicing knife reciprocable with respect to said carriage, said carriage having a generally horizontal top surface, a tray having a lower surface adapted to support work material thereon, said lower surface being of less width than said carriage closely overlying the surface thereof, a shaft supported from said carriage for mounting said tray for swinging movement and for sliding movement across the top of said carriage to a position substantially within the plane of said knife, a pusher plate carried by said tray and movable therewith substantially into the plane of the knife, means for adjustably mounting said pusher plate on said lower surface of the tray to provide for movement thereof along such surface, and means for retaining said pusher plate in any predetermined position of adjustment thereon to clamp work material upon the upper surface thereof, said entire tray and pusher plate together with work material thereon being swingable about said shaft to lift the same above the surface of said carriage.

13. A carriage for a slicing machine comprising a tray having a lower surface adapted to support work material thereon, said lower surface being of less width than said carriage closely overlying the surface thereof, means on said carriage for mounting said tray for movement across said carriage forwardly to substantially the edge of said carriage, a pusher plate base carried on the lower surface of said tray having a lower surface extending substantially to the forward edge of said tray and movable with said tray to a position substantially at the forward edge of said carriage, a pusher plate, and means on said base for mounting said pusher plate for adjustment with respect to said base.

14. A manually reciprocable carriage for a slicing machine comprising a tray having a lower surface of less width than said carriage closely overlying the surface thereof, means on said carriage for mounting said tray for transverse movement across said carriage, a pusher plate base carried by said tray, a pusher plate, means for adjustably mounting said base for longitudinal movement along the lower surface of said tray in the direction of the reciprocating movement of said carriage, means for mounting said pusher plate for adjustment about an axis normal to said base, and means for retaining said pusher plate in an intermediate position at a substantial angle to both the direction of said transverse and said longitudinal movements.

15. The combination with a carriage for a slicing machine adapted to have a reciprocating motion, of a tray having a lower surface of less width than said carriage closely overlying the surface thereof, the carriage at the forward edge thereof extending upwardly substantially into the plane of said tray said tray also having an upwardly extending surface adjacent one end thereof, a pusher plate base carried by the lower surface of said tray, means mounting said base for longitudinal adjusting movement towards and away from said upwardly extending surface of said tray, a pusher plate adapted to clamp work material against said upwardly extending surface of the tray, and means on said base for mounting said pusher plate in adjustable relation with respect to said base.

16. The combination with a reciprocable carriage for a slicing machine comprising a tray having a lower surface of less width than said carriage closely overlying the surface thereof, said carriage having a portion adjacent its edge extending upwardly substantially into the plane of the lower surface of said tray, means for mounting said tray on said carriage for movement across said carriage, a pusher plate base slidably and adjustably carried by said tray and having a portion lying in generally the same plane as said edge portion of the carriage, a pusher plate, means on said base for mounting said pusher plate, and means providing for adjusting the positioning of said pusher plate with respect to said tray to provide for clamping an article adapted to be sliced in slicing position with the article supported simultaneously upon the pusher plate base, the tray and the edge of the carriage.

17. A slicing machine of the character described comprising a knife, a carriage reciprocable across the face of said knife, a tray having a lower surface closely overlying said carriage, said tray also having an upwardly extending surface adjacent one end thereof, means on said carriage for mounting said tray for movement across said carriage toward and away from said knife, a pusher plate base having a portion adapted to support work material thereon carried by said tray, means for mounting said base for adjustment along said lower surface of said tray in the direction of the reciprocating movement of said carriage and towards and away from said upwardly extending surface of the tray, the marginal portion of said base member adjacent said upwardly extending surface of the tray having an upwardly sloping surface providing for lifting work material upon said base as the base moves thereunder, an upright means carried by said pusher plate base, and a pusher plate carried by said upright means.

18. A slicing machine of the character described comprising a knife, a carriage reciprocable across the face of said knife, a tray having a lower surface closely overlying said carriage, means on said carriage for mounting said tray for movement across said carriage toward and away from said knife, a substantially flat pusher plate base member adapted for supporting engagement with work material received on said tray, said base member being carried by said tray and having portions extending laterally beyond the longitudinal edges of said tray, means for mounting said base member for longitudinal adjustment along said lower surface of said tray in the direction of the reciprocating movement of said carriage, said laterally extending portions having downwardly inclined upper surfaces projecting beneath the level of said lower surface of said tray to provide for lifting work material upon said base member as the base member moves thereunder, and means for clamping the work material upon said base and tray.

THEODORE C. BROOKHART.
DAVID A. MEEKER.